US008620727B2

(12) United States Patent
Pageler

(10) Patent No.: US 8,620,727 B2
(45) Date of Patent: Dec. 31, 2013

(54) BUSINESS PERFORMANCE SEGMENTATION MODEL

(76) Inventor: Terence V. Pageler, Lenexa, KS (US)

( * ) Notice: Subject to any disclaimer, the term of this patent is extended or adjusted under 35 U.S.C. 154(b) by 0 days.

(21) Appl. No.: 13/212,353

(22) Filed: Aug. 18, 2011

(65) Prior Publication Data

US 2012/0046997 A1    Feb. 23, 2012

Related U.S. Application Data

(60) Provisional application No. 61/374,811, filed on Aug. 18, 2010.

(51) Int. Cl.
G06Q 10/00    (2012.01)

(52) U.S. Cl.
USPC .............................. 705/7.38; 705/7.29

(58) Field of Classification Search
USPC ............... 705/7.11–7.42, 14.1–14.73
See application file for complete search history.

(56) References Cited

U.S. PATENT DOCUMENTS

| | | | |
|---|---|---|---|
| 5,193,056 A | 3/1993 | Boes | |
| 5,649,114 A * | 7/1997 | Deaton et al. | 705/14.35 |
| 5,963,910 A * | 10/1999 | Ulwick | 705/7.28 |
| 6,115,691 A * | 9/2000 | Ulwick | 705/7.32 |
| 6,954,758 B1 * | 10/2005 | O'3 Flaherty | 707/802 |
| 7,272,817 B1 | 9/2007 | Hinkle et al. | |
| 7,424,439 B1 * | 9/2008 | Fayyad et al. | 705/7.33 |
| 7,596,521 B2 | 9/2009 | Lepman | |
| 7,672,863 B2 | 3/2010 | Kurosawa et al. | |
| 7,707,059 B2 * | 4/2010 | Reed et al. | 705/7.31 |
| 8,027,871 B2 * | 9/2011 | Williams et al. | 705/7.31 |
| 8,271,313 B2 * | 9/2012 | Williams et al. | 705/7.11 |
| 2004/0103017 A1 * | 5/2004 | Reed et al. | 705/10 |
| 2004/0103051 A1 * | 5/2004 | Reed et al. | 705/36 |
| 2005/0010472 A1 * | 1/2005 | Quatse et al. | 705/14 |
| 2005/0033631 A1 * | 2/2005 | Wefers et al. | 705/10 |
| 2005/0189414 A1 * | 9/2005 | Fano et al. | 235/383 |
| 2006/0242046 A1 * | 10/2006 | Haggerty et al. | 705/35 |
| 2007/0043615 A1 * | 2/2007 | Dahleh et al. | 705/14 |
| 2008/0082386 A1 * | 4/2008 | Cunningham et al. | 705/8 |
| 2009/0018996 A1 * | 1/2009 | Hunt et al. | 707/2 |
| 2011/0173049 A1 * | 7/2011 | McHale | 705/7.36 |

OTHER PUBLICATIONS

"The CRM Process: Its Measurement and Impact on Performance"; Werner Reinartz, Manfred Krafft, and Wayne D. Hoyer; Journal of Marketing Research; Jan. 2004.*

"The Role of Relational Information Processes and Technology Use in Customer Relationship Management"; Satish Jayachandran, Subhash Sharma, Peter Kaufman, & Pushkala Raman; Journal of Marketing vol. 69 (Oct. 2005), 177-192.*

* cited by examiner

Primary Examiner — Alan S Miller
(74) Attorney, Agent, or Firm — Law Office of Mark Brown, LLC; Mark E. Brown; Christopher M. DeBacker

(57) ABSTRACT

A customer trending analysis and reporting system that enables business users to augment their internally focused accounting measurement systems with an outward, customer-focused measurement so as to simply define and quantify historic performance implications of customer satisfaction and retention, while concurrently clarifying forward opportunity ongoing, around which the organization at large will naturally align to purposefully and more efficiently improve the business's growth performance.

9 Claims, 1 Drawing Sheet

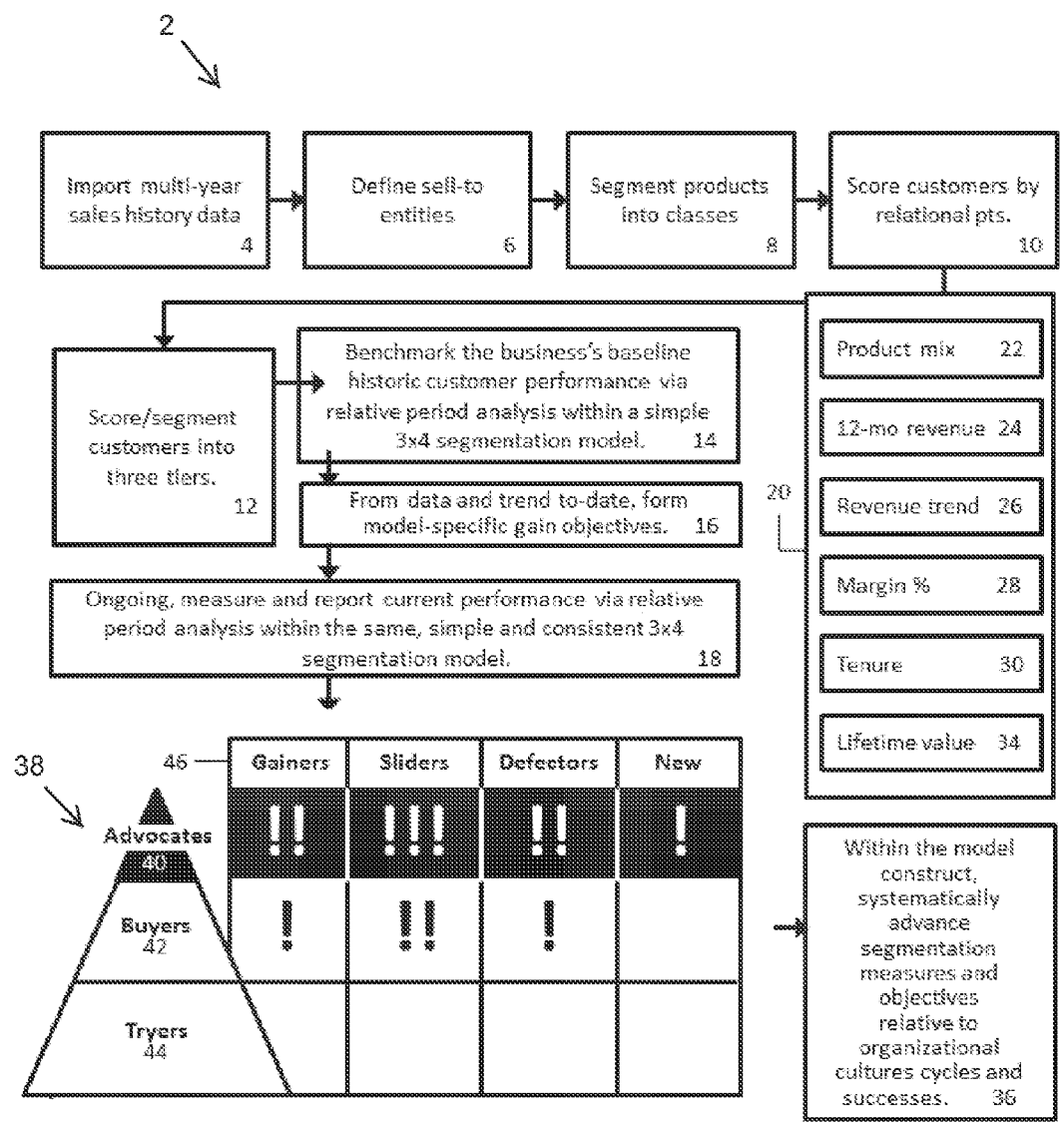

BUSINESS PERFORMANCE SEGMENTATION MODEL

This application claims priority in U.S. Provisional Patent Application No. 61/374,811, filed Aug. 18, 2010, which is incorporated herein by reference.

BACKGROUND OF THE INVENTION

1. Field of the Invention

The present invention relates generally to using performance history of customers to define and quantify business performance both strong and weak, and in terms of past and forward growth potential. The invention is a mechanism by which to cause disparate business departments and personnel to form higher performance alignment.

2. Description of the Related Art

Sales analysis repeatedly shows that companies experience significant revenue leakage due to sales erosion from their existing customer base. Wanting growth, businesses put pressure on the sales department to pursue new customers. As reps focus outward, current customers receive insufficient attention while at the same time they are extensively courted by competitive companies who themselves are pursuing new customers. As a result, existing-customer relationships soften, along with sales and growth. The rate of erosion in dollar terms typically far surpasses the rate new customer sales are added. Thus, the standard and dominant practice to spur growth paradoxically diminishes it, causing the cycle to be repeated wherein the sales group is pressured further, while customer-support budgets are tightened due to reduced revenues.

The root cause for revenue leakage traces to legacy accounting-oriented measurement practices. "Modern" double-ledger accounting practices originated in the early 1300s AD. Generally Accepted Accounting Principles (GAAP) include four primary measurements: 1) Revenue, 2) Unit counts, 3) Cost of Goods sold and other costs (including Sales, General and Administrative (SG&A)), and Profit.

Standard measurements have served businesses well for centuries and will remain a stalwart of business. However, the formation of the Internet at the end of the $20^{th}$ Century brought with it a sudden transfer of information to the buying consumer. Buyers today have the ability to quickly access product features, pricing, product reviews and a host of purchase and delivery options, all from their computer and mobile devices.

Businesses have taken account of the transfer of information to the consumer. Vision and mission statements today routinely include language related to "customer intimacy", "customer driven," or "customer focused." Business intent, however, has not met with equal follow-through; not for lack of want, but for lack of effective, efficient measurement capability.

Whereas revenue and costs are finite measures, customer perceptions are ever-changing and perceptive in nature. Business information systems are accounting oriented. They deal in finite units such as dollars and unit quantities. Such systems and those who design them have been either 1) not adept at quantifying "gray" areas such as perceptions, or 2) so highly adept the resulting statistician- and PhD-formed measurement equations are beyond the ability of the common worker to easily comprehend and apply in real world instances.

Ultimately businesses practices form around what is readily measurable. The ability to readily account for sales, margin, costs and units keeps such measures primary in the corporate mix. Equally simple customer trending and satisfaction measures remain largely absent.

Simplicity and repeatability of measurement are primary requirements within the corporate environment. Sales, units, costs and profit have remained rooted as business measures precisely because they are repeatable measures and understandable across the organization, from the white collar executive to the sales clerk to the shipping dock. To be effective, measures of customer satisfaction must be formed and calculated within a framework that is readily reproducible and easily understood. While trained analysts, researchers and statisticians may be able to form a point-in-time measurement of customer satisfaction, standard statistical devices such as regression analyses are far beyond the comprehension and applicability of the average customer-facing worker. Therefore, while customer measures can be obtained, for them to be actionable (valuable) simplicity is a fundamental requirement to enable action at the outer edges of the organization—sales, service and support functions—where customer relationships are formed and nurtured.

Lacking an effective, simple method to measure trended customer satisfaction, businesses maintain emphasis on their legacy accounting methods (GAAP) as dominant business measures. As a result, generally accepted sales marketing practices are also retained. The basis for conventional sales and marketing practices trace back to the late 1950s when models such as the "4Ps" and the "Hierarchy of Effects" and the "Marketing Mix" were first presented. The mid $20^{th}$ century was the Golden Age of Marketing with the post war boom creating high consumer demand and readily available resource to accommodate both the manufacturing and purchase. The product- and manufacturing-based business models became deeply embedded and remain entrenched in today's business practices and business education. But, as described herein, today's markets are no longer product and manufacturing oriented. Today's economy is driven by an information & service economy and customers.

The invention injects a new measurement into the traditional GAAP by taking component measures of old, and blending them in such a way as to simply define customer perceptions and predict future performance.

SUMMARY OF THE INVENTION

In the practice of an aspect of the present invention, a system and method are provided for enabling users to simply measure the depth and trending of the business/customer relationship ongoing for each customer and in aggregate, by uniting 1) component attribute measurements currently available within general accounting purposes with 2) non standard measures which prove to be significant yet simple gages of customer satisfaction, retention and growth.

BRIEF DESCRIPTION OF THE DRAWINGS

FIG. 1 shows a flow chart representing a system embodying the present invention.

DETAILED DESCRIPTION OF THE PREFERRED EMBODIMENTS

I. Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately-detailed structure. Certain terminology will be used in the following description for convenience in reference only and will not be limiting. Said terminology will include the words specifically mentioned, derivatives thereof and words of similar meaning.

A business analytics and reporting system merges 1) tiered customer segmentation formed from historic measures with 2) current and trended performance measurements to form actionable customer-trending intelligence.

The system includes:
Benchmark depth analysis of business-specific historic growth mechanics
Scoring of customers using a multiple of relationship indicative factors
Setting of specific, model-related objectives
Ongoing customer-specific satisfaction trend analysis and reporting over the internet via software.

A main database contains calculations of the system's segmentation and the client web-enabled software is adapted for providing a service over a network, which can comprise the worldwide web (Internet). The system is designed to be used with a computer, including a computerized database stored in some form of computer memory and a typical computer processor capable of processing, analyzing, and reporting data. Customer data is entered into the computer database, which may be analyzed according to the system software, and a report is generated.

Referring to the FIGURE in more detail, FIG. 1 generally represents a business analysis and reporting system 2. The system 2 is a business analysis software program stored on a computer with access to a computer database filled with customer data of a business' choosing. This system relies on segmentation of available consumer data, which defines: (1) who the businesses' best customers are based upon relevant identified data points; and (2) how those customers are performing over time. Customers are segmented into a three tiered hierarchy 38: advocates 40 are typically a business' best customers, typically representing the top 10% of business; buyers 42 are the second tier of a business' customers, commonly representing around 30% of customers; and tryers 42, which make up the remaining 60% of a business' customer base.

The most basic analysis of customer performance is based upon a "revenue only" calculation. Providing customer and business statistics above "revenue only" increases a business' ability to identify its best customers, and allows a business to focus its efforts accordingly.

The business analysis and reporting system 2 further measures four relative performance mechanics 46: "gainers", which represents customers which have grown from year to year; "sliders", which represents customers which have reduced sales year to year; "new" which represents customers who have no sales in the prior year; and "defectors," which represents customers who have prior-year purchases, but none in the following year(s). Correlating the customer hierarchy 38 with the relative performance mechanics 46, a business provides businesses with increased knowledge as to where their focus should be.

Relevant business and customer data must be gathered and input into the system 2 in order to analyze and report results to the end-user business. FIG. 1 demonstrates what data should be gathered and the method by which the hierarchy of customers 38 and the four relative performance mechanics 46 are calculated.

The first step 4 is to import multi-year sales history data. This data allows a business to make a first-pass at categorizing its customers. During the second step 6, the system 2 will define the "sell-to" entities (customers) as "gainers," "sliders," "defectors," or "new." A third step 8 has the system 2 segment the business' products into classes, providing value based upon products being sold. During the fourth step 10, customers are then scored based upon a number of relational points. A number of relational points 20 are used to evaluate, score, and segment customers into the appropriate categories. These points include, but are not limited to, product mix 22 purchased by customers; a twelve-month review 24 of a customer's purchases; a revenue trend 26 based upon the customer's purchases; the margin percentage 28 of each customer's purchases; the tenure 30 of a customer with the business; and a "lifetime value" 34 score of that customer.

At the fifth step 12, customer scores are calculated based upon the relational points 20 which the system 2 is instructed to analyze and score each customer, and to segment those customers into three separate tiers: advocates 40, buyers 42, and tryers 44. At the sixth step 14, the system 2 will benchmark the business' baseline historic customer performance by comparing it with relative period analyses within a simple 3×4 segmentation model, as described above. At the seventh step 16, model-specific gain objections are formed from the appropriated and scored customer data and the benchmark trend-to-date data.

At the eighth step 18, an ongoing measurement analysis is performed. Customer score data is measured and reported to the business. Current customer performance, as compared to relative period analysis, is placed into a segmentation model as illustrated. This allows the business to know where the majority of its income is coming from, and adjust its approach accordingly. A result is reported to the business, and the business adopts a plan 36 accordingly.

The following chart is an example of how such a 3×4 segmentation model may be reported:

TABLE 1

|  | GAINERS | SLIDERS | DEFECTORS | NEW |
| --- | --- | --- | --- | --- |
| ADVOCATES | Service | Respond | Embrace | Win Back |
| BUYERS | Cross Sell | Respond | Retain | Remarket |
| TRYERS | Up Sell | Query | Retain | List |

The system 2 will generate a report as seen in Table 1 based upon preset responses selected by the business. Each segment of the 3×4 segmentation model may further be ranked depending on the value to the business as determined by the system's results. For example, the system may report that the highest profit margins tend to result from Advocates 40 who are categorized as "sliders." The system will then rank this particular segment higher than other segments, indicating that the business should increase its focus on responding to those advocate-sliders and reduce its focus in other areas.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. A system for analyzing customer data and reporting a customer score, the system comprising: a database capable of storing computer-readable data; a computer including a processor, said processor capable of analyzing data stored within said database;

a first data set comprising tiered customer segmentation statistics drawn from previously recorded and stored historic measures;
a second data set comprising current and trended performance measurements related to customers;
a multi-year sales history data set being generated from merging said first data set and said second data set into a merged data set with said processor;
said processor being further capable of analyzing said multi-year sales history data set;
a customer score produced by said processor upon analyzing said multi-year sales history data set;
said processor being further capable of reporting the analysis of said multi-year sales history data set and said customer score to an end user;
wherein said customer score is used to establish a level of customer interaction between said end user and said customer;
wherein a customer associated with advocating business with said end user and associated with increased interaction with said end user is provided a first level of interaction with said end user;
wherein a customer associated with purchasing from said end user and associated with increased interaction with said end user is provided a second level of interaction with said end user;
wherein a customer associated with trying goods from said end user and associated with increased interaction with said end user is provided a third level of interaction with said end user;
wherein a customer associated with advocating business with said end user and associated with decreased interaction with said end user is provided a fourth level of interaction with said end user;
wherein a customer associated with purchasing from said end user and associated with decreased interaction with said end user is provided a fifth level of interaction with said end user;
wherein a customer associated with trying goods from said end user and associated with decreased interaction with said end user is provided a sixth level of interaction with said end user;
wherein a customer associated with advocating business with said end user and associated with hostile interaction with said end user is provided a seventh level of interaction with said end user;
wherein a customer associated with purchasing from said end user and associated with hostile interaction with said end user is provided an eighth level of interaction with said end user;
wherein a customer associated with trying goods from said end user and associated with hostile interaction with said end user is provided a ninth level of interaction with said end user;
wherein a customer associated with advocating business with said end user and associated with ceasing all interaction with said end user is provided a tenth level of interaction with said end user;
wherein a customer associated with purchasing from said end user and associated with ceasing all interaction with said end user is provided an eleventh level of interaction with said end user; and
wherein a customer associated with trying goods from said end user and associated with ceasing all interaction with said end user is provided a twelfth level of interaction with said end user.

2. The system according to claim 1, further comprising:
a third data set comprising business-specific historic growth mechanics; and
said processor being further capable of performing a benchmark depth analysis of said third data set.

3. The system according to claim 2, further comprising:
a fourth data set comprising customer relationship indicative factors; and
said processor being further capable of calculating a customer score based upon said fourth data set.

4. The system according to claim 3, further comprising:
a fifth data set comprising specific, model-related objectives; and
said processor being further capable of processing said first, second, third, and fourth data sets based upon the objectives of said fifth data set.

5. The system according to claim 4, further comprising:
a sixth data set comprising customer-specific satisfaction trends based upon ongoing analyses performed by said processor.

6. The system according to claim 5, further comprising:
software adapted for connecting said database and said processor to a computer network, including the internet; and
said processor being further capable of reporting said first, second, third, fourth, fifth, and sixth data sets to an end user via said computer network.

7. The system according to claim 1, further comprising:
said processor being further capable of calculating the customer segmentation values of said first data set.

8. A system for analyzing and reporting business-relevant data, comprising:
a database capable of storing computer-readable data; a computer including a processor, said processor capable of analyzing data stored within said database;
a first data set comprising tiered customer segmentation statistics drawn from previously recorded and stored historic measures;
a second data set comprising current and trended performance measurements related to customers;
a third data set comprising business-specific historic growth mechanics;
a fourth data set comprising customer relationship indicative factors;
a fifth data set comprising specific, model-related objectives;
a sixth data set comprising customer-specific satisfaction trends based upon ongoing analyses performed by said processor;
a multi-year sales history data set being generated from merging said first data set and said second data set into a merged data set with said processor;
said processor being further capable of analyzing said multi-year sales history data;
said processor being further capable of performing a benchmark depth analysis of said third data set;
said processor being further capable of calculating a customer score based upon said fourth data set;
said processor being further capable of processing said first, second, third, and fourth data sets based upon the objectives of said fifth data set;
software adapted for connecting said database and said processor to a computer network, including the internet; said
processor being further capable of reporting the analysis of said multi-year sales history data set and said customer score to an end user;

said processor being further capable of reporting the analyses of said first, second, third, fourth, fifth, and sixth data sets and said customer score to an end user via said computer network;
wherein said customer score is used to establish a level of customer interaction between said end user and said customer;
wherein a customer associated with advocating business with said end user and associated with increased interaction with said end user is provided a first level of interaction with said end user;
wherein a customer associated with purchasing from said end user and associated with increased interaction with said end user is provided a second level of interaction with said end user;
wherein a customer associated with trying goods from said end user and associated with increased interaction with said end user is provided a third level of interaction with said end user;
wherein a customer associated with advocating business with said end user and associated with decreased interaction with said end user is provided a fourth level of interaction with said end user;
wherein a customer associated with purchasing from said end user and associated with decreased interaction with said end user is provided a fifth level of interaction with said end user;
wherein a customer associated with trying goods from said end user and associated with decreased interaction with said end user is provided a sixth level of interaction with said end user;
wherein a customer associated with advocating business with said end user and associated with hostile interaction with said end user is provided a seventh level of interaction with said end user;
wherein a customer associated with purchasing from said end user and associated with hostile interaction with said end user is provided an eighth level of interaction with said end user;
wherein a customer associated with trying goods from said end user and associated with hostile interaction with said end user is provided a ninth level of interaction with said end user;
wherein a customer associated with advocating business with said end user and associated with ceasing all interaction with said end user is provided a tenth level of interaction with said end user;
wherein a customer associated with purchasing from said end user and associated with ceasing all interaction with said end user is provided an eleventh level of interaction with said end user; and
wherein a customer associated with trying goods from said end user and associated with ceasing all interaction with said end user is provided a twelfth level of interaction with said end user.

9. A method of analyzing and reporting customer data, the method comprising the steps:
providing a database capable of storing computer-readable data;
providing a computer including a processor, said processor capable of analyzing data stored within said database;
providing a first data set comprising tiered customer segmentation statistics drawn from previously recorded and stored historic measures;
providing a second data set comprising current and trended performance measurements related to customers;
providing a third data set comprising business-specific historic growth mechanics;
providing a fourth data set comprising customer relationship indicative factors;
providing a fifth data set comprising specific, model-related objectives;
providing a sixth data set comprising customer-specific satisfaction trends based upon ongoing analyses performed by said processor;
merging said first, second, third, fourth, fifth, and sixth data sets into a merged data set with said computer;
analyzing said merged data set with said computer;
performing a benchmark depth analysis of said merged data set with said computer;
calculating a customer score based upon said merged data set with said computer;
processing said data set based upon the objectives of said fifth data set with said computer;
connecting said database and said processor to a computer network, including the internet with said computer;
reporting the analysis of said merged data sets and said customer score to an end user;
establishing a level of customer interaction between said end user and said customer based upon said customer score;
wherein a customer associated with advocating business with said end user and associated with increased interaction with said end user is provided a first level of interaction with said end user;
wherein a customer associated with purchasing from said end user and associated with increased interaction with said end user is provided a second level of interaction with said end user;
wherein a customer associated with trying goods from said end user and associated with increased interaction with said end user is provided a third level of interaction with said end user;
wherein a customer associated with advocating business with said end user and associated with decreased interaction with said end user is provided a fourth level of interaction with said end user;
wherein a customer associated with purchasing from said end user and associated with decreased interaction with said end user is provided a fifth level of interaction with said end user;
wherein a customer associated with trying goods from said end user and associated with decreased interaction with said end user is provided a sixth level of interaction with said end user;
wherein a customer associated with advocating business with said end user and associated with hostile interaction with said end user is provided a seventh level of interaction with said end user;
wherein a customer associated with purchasing from said end user and associated with hostile interaction with said end user is provided an eighth level of interaction with said end user;
wherein a customer associated with trying goods from said end user and associated with hostile interaction with said end user is provided a ninth level of interaction with said end user;
wherein a customer associated with advocating business with said end user and associated with ceasing all interaction with said end user is provided a tenth level of interaction with said end user;

wherein a customer associated with purchasing from said end user and associated with ceasing all interaction with said end user is provided an eleventh level of interaction with said end user; and wherein a customer associated with trying goods from said end user and associated with ceasing all interaction with said end user is provided a twelfth level of interaction with said end user.

* * * * *